United States Patent
Xiao et al.

(10) Patent No.: US 12,415,146 B2
(45) Date of Patent: Sep. 16, 2025

(54) LOW TEMPERATURE DECONTAMINATION OF TRITIATED WATER

(71) Applicants: BATTELLE SAVANNAH RIVER ALLIANCE, LLC, Aiken, SC (US); SAVANNAH RIVER NUCLEAR SOLUTIONS, LLC, Aiken, SC (US)

(72) Inventors: Xin Xiao, Augusta, GA (US); Lucas M. Angelette, Augusta, GA (US); Henry T. Sessions, Jr., Aiken, SC (US); Robert L. Rabun, III, North Augusta, SC (US); James E. Klein, Martinez, GA (US); John Kvartek, Aiken, SC (US)

(73) Assignees: Battelle Savannah River Alliance, LLC, Aiken, SC (US); Savannah River Nuclear Solutions, LLC, Aiken, SC (US)

( * ) Notice: Subject to any disclaimer, the term of this patent is extended or adjusted under 35 U.S.C. 154(b) by 490 days.

(21) Appl. No.: 17/848,878

(22) Filed: Jun. 24, 2022

(65) Prior Publication Data
US 2023/0415071 A1     Dec. 28, 2023

(51) Int. Cl.
*B01D 15/00*     (2006.01)
*B01D 53/04*     (2006.01)
(Continued)

(52) U.S. Cl.
CPC ........ *B01D 15/00* (2013.01); *B01D 53/0462* (2013.01); *B01J 20/18* (2013.01);
(Continued)

(58) Field of Classification Search
None
See application file for complete search history.

(56) References Cited

U.S. PATENT DOCUMENTS

| 4,376,066 A | 3/1983 | Bruggeman et al. |
| 5,122,163 A | 6/1992 | Ide et al. |

(Continued)

FOREIGN PATENT DOCUMENTS

| JP | 2003071251 | 3/2003 |
| WO | WO 2016/034745 | 3/2016 |

OTHER PUBLICATIONS

Cao, et al. "Reemission of Tritium from Tritium-Sorbed Molecular Sieve" *Fusion Sci. Technol.* 48 (2005) pp. 593-596. (Abstract only).
Fulbright, et al. "Status and Practicality of Detritiation and Tritium Production Strategies for Environmental Remediation" *U. South Carolina, et al.* WSRC-RP-96-0075 (1996) pp. 1-293.
Geniesse, et al. "2009 Evaluation of Tritium Removal and Mitigation Technologies for Wastewater Treatment" *US Dept. Energy* DOE/RL-2009-18 (2009) pp. 1-51.
(Continued)

*Primary Examiner* — Clare M Perrin
(74) *Attorney, Agent, or Firm* — Dority & Manning, P.A.

(57) ABSTRACT

Methods and systems directed to the separation of tritium from an aqueous stream are described. The separation method is a multistage method that includes a purification stage during which tritium of a tritium-contaminated aqueous stream is adsorbed onto a cooled and wet separation phase, a regeneration stage during which the adsorbed tritium is exchanged with hydrogen in a gaseous stream to regenerate the separation phase and provide a gaseous stream with a high tritium concentration, and a third stage during which the tritium of the gaseous stream is separated from the gaseous stream as a gaseous tritium product.

21 Claims, 16 Drawing Sheets

(51) Int. Cl.
  *B01J 20/18* (2006.01)
  *B01J 20/28* (2006.01)
  *B01J 20/283* (2006.01)
  *B01J 20/34* (2006.01)
  *C01B 4/00* (2006.01)
  *G21F 9/12* (2006.01)

(52) U.S. Cl.
  CPC ....... *B01J 20/28052* (2013.01); *B01J 20/283* (2013.01); *B01J 20/3408* (2013.01); *B01J 20/3466* (2013.01); *C01B 4/00* (2013.01); *G21F 9/12* (2013.01); *B01D 2257/108* (2013.01)

(56) References Cited

U.S. PATENT DOCUMENTS

| | | | |
|---|---|---|---|
| 5,445,803 | A | 8/1995 | Dworschak et al. |
| 5,954,968 | A | 9/1999 | Patterson |
| 6,165,438 | A | 12/2000 | Willms et al. |
| 6,332,914 | B1 | 12/2001 | Lee |
| 6,432,174 | B1 | 8/2002 | Heung |
| 6,632,367 | B1 | 10/2003 | Furlong et al. |
| 9,682,860 | B2 | 6/2017 | Maroun et al. |
| 10,381,121 | B2 | 8/2019 | Xiao |
| 10,436,516 | B2 | 10/2019 | Heung et al. |
| 2010/0178237 | A1 | 7/2010 | Bonnettt et al. |
| 2016/0233001 | A1 | 8/2016 | Koyanaka |
| 2016/0284433 | A1* | 9/2016 | Xiao ................ G21F 9/12 |
| 2019/0193026 | A1 | 6/2019 | Kaneko et al. |
| 2020/0027616 | A1* | 1/2020 | Xiao ................ C02F 1/285 |
| 2020/0230553 | A1* | 7/2020 | Xiao ................ B01D 53/96 |
| 2022/0266197 | A1 | 8/2022 | Cooper et al. |

OTHER PUBLICATIONS

Heung, et al. "Tritium Stripping by a Catalytic Exchange Stripper" *Fusion Sci. Technol.* 21 (1992) pp. 588-593.

Iwai, et al. "Isotopic Distribution Coefficient of Tritiated Water Adsorbed on Faujasite—Type Zeolite" *Fusion Sci. Technol.* 56 (2009) pp. 158-162. (Abstract only).

King, et al. "Concepts for Detritiation of Waste Liquids" *Savannah River Co.*, et al. WSRC-MS-91-027 (1991) pp. 1-22.

LDRD. "2016 Annual Report" *Savan. River Nat'l. Lab.* (2016) pp. 1-5.

Lin, K.H. "Tritium Enrichment by Isotope Separation Technique" *Oak Ridge Nat'l Lab.* ORNL-TM-3976 (1972).

Lozada-Hidalgo, et al. "Sieving hydrogen isotopes through two-dimensional crystals" *Science* 351 (2016) pp. 68-70.

Nishikawa, et al. "Comparison of Precious Metal Catalysts with Hydrophilic Porous Substrate for Tritium Cleanup System" *J. Nucl. Sci. Technol.* 26 (1989) pp. 261-269.

Rae, H.K. "Ch. 1—Selecting Heavy Water Processes" *Separ. Hydrog. Isotope* (1978) pp. 1-26.

Tanaka, et al. "Removal of Tritiated Water Vapor by Adsorption on Molecular Sieves—Effects and Development of Co-Existing $H_2O$" *Fusion Sci. Technol.* 8 (1985) pp. 2196-2201. (Abstract only).

Xiao, et al. "Development of Liquid Phase Water Detritiation Technology" *Savannah River Nucl. Sol.* (2016) pp. 22-25.

Zhou, et al. "Equipment design for thermal cycling absorption process column efficiency test" *Int'l J. Hydrog. Energ.* 39 (2014) pp. 13880-13885.

International Search Report and Written Opinion for PCT/US2023/026079, dated Nov. 6, 2023, 11 pages.

* cited by examiner

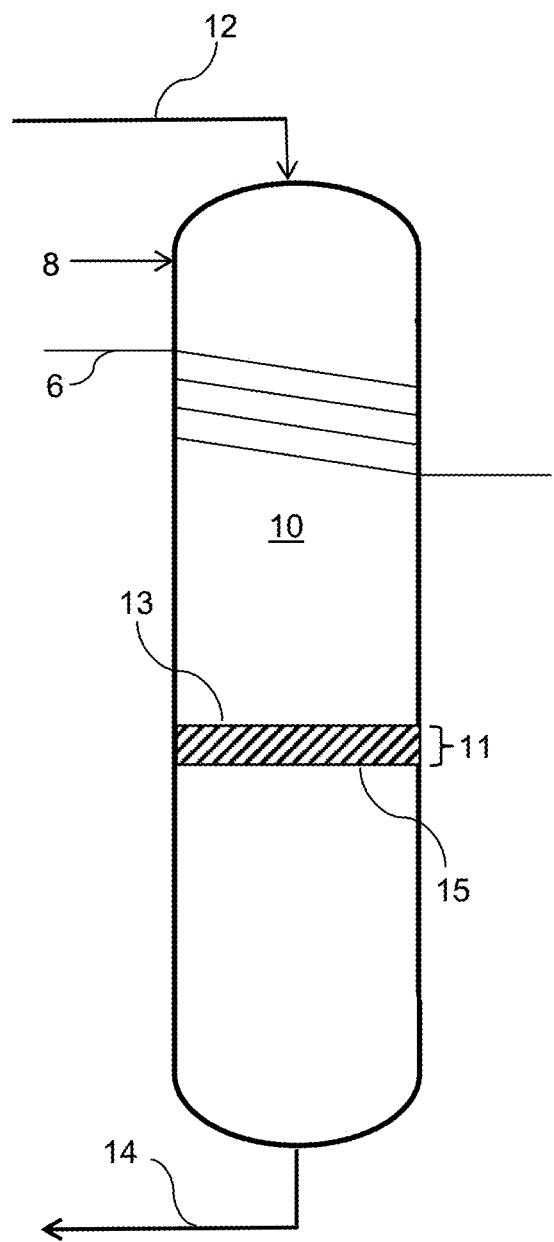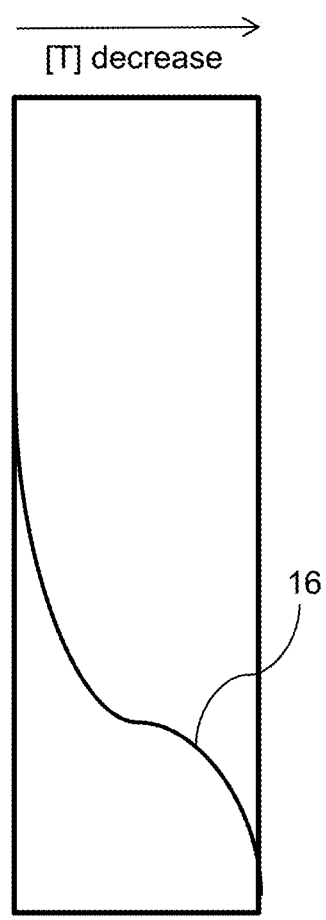
FIG. 1A                    FIG. 1B

LOW TEMPERATURE DECONTAMINATION OF TRITIATED WATER

STATEMENT AS TO RIGHTS TO INVENTIONS MADE UNDER FEDERALLY SPONSORED RESEARCH

This invention was made with Government support under Contract No. DE-AC09-08SR22470, awarded by the United States Department of Energy. The Government has certain rights in the invention.

BACKGROUND

Tritium is a low energy beta emitter, and while it is not dangerous externally, it is a radiation hazard upon inhalation, ingestion, or absorption. Tritium can be produced in nuclear power generation as a byproduct of the fission of uranium-235, plutonium-239, and uranium-233, as well as by neutron activation of lithium-6. In heavy water-moderated and -cooled reactors, tritium can be produced when a deuterium nucleus captures a neutron. Though relatively small amounts of tritium are produced via such routes, it readily binds hydroxyl radicals to form tritiated water. As such, tritiated water can build up over time within cooling water, as well as within water used in storage pools, at nuclear power generating facilities. For example, tritiated water is understood to be the major source for aqueous release of radioactivity to surface streams and rivers from nuclear power generation facilities, and a 2011 Japanese earthquake resulted in the release of millions of gallons of tritium-contaminated water from the Fukushima Daiichi nuclear plant. Tritium contamination of groundwater in the vicinity of nuclear power generation facilities has led to public outcry and to negative publicity for the nuclear power industry.

Methods that have been developed for the removal of tritium from contaminated water include water distillation, electrolysis, liquid phase catalytic exchange (LPCE), and vapor phase catalytic exchange (VPCE). Unfortunately, problems exist with such methods. For instance, water distillation is energy intensive, as the water ($H_2O$) vapor pressure is only 1.056 times of that of tritiated water (HTO). Due to a high reflux ratio of about 30, huge reboiler duty and large column diameter are required. The small separation factor also requires an extreme column height for the hundreds of theoretical plates necessary for the process. Electrolysis has a very good tritium separation factor, but it is difficult to stage and is very energy intensive. LPCE has been combined with electrolysis in a process known as Combined Electrolysis Catalytic Exchange (CECE). CECE has been demonstrated to work well in large pilot facilities. Unfortunately, the process requires a high concentration of tritium in the treatment water and the current capacity is still orders of magnitude smaller than the need in many facilities.

Since the water molecule has drastically different chemical and physical properties, water isotope separation methods are different. For elemental hydrogen isotope separation, cryogenic distillation has shown promise based on slight difference of boiling points ($H_2$, HD, $D_2$, HT, DT, $T_2$), but the successful production experience of more recently developed technologies such as the thermal cycling absorption process (TCAP) exhibit improved performance.

Improved methods for tritium decontamination have been developed such as multistage separation processes as described in U.S. Pat. No. 10,381,121 to Xiao. While such demonstrates improvement in the art, room for further improvement exists.

SUMMARY

According to one embodiment, disclosed is a process for removal and recovery of tritium from tritium-contaminated water. The process includes cooling the contents of an enrichment column to a temperature of about 20° C. or less. The contents of the enrichment column can include a separation phase and a catalyst, and a method can also include contacting the cooled separation phase with an aqueous stream that includes tritium-contaminated water and a carrier gas. Upon this contact, tritium can be preferentially adsorbed onto the surface of the separation phase, for instance via liquid phase surface water exchange, thereby purifying the aqueous stream. In some embodiments, the contents of the enrichment column can be wet prior to contacting the cooled separation phase with the aqueous stream.

Following a purification stage, the process can include contacting the separation phase that includes the adsorbed tritium with a regeneration stream. The regeneration stream includes protium and/or deuterium in the form of hydrogen gas ($H_2$), deuterium gas ($D_2$), hydrogen deuteride (HD), or any mixture thereof. The catalyst of the enrichment column can catalyze an isotopic exchange between the adsorbed tritium and the protium and/or deuterium of the regeneration stream, thereby forming a tritium-enriched gaseous stream.

Following a regeneration stage, tritium can be separated from a tritium-enriched gaseous stream. For example, the tritium-enriched gaseous flow can be subjected to a thermal cycling absorption process.

Also disclosed is a system for removal and recovery of tritium from a tritium-contaminated aqueous stream. The system can include an enrichment column that can be utilized for both the first stage and the second stage of the process. These two stages can be carried out in counterflow direction to one another through the enrichment column. For instance, the enrichment column can include a first inlet at a first end (e.g., at the top) for receiving a tritium-contaminated aqueous stream and can include a first outlet at a second end (e.g., at the bottom) for exit of a purified aqueous stream. The column can also include a second inlet at the second end for a gaseous regeneration stream that includes protium and/or deuterium and a second outlet at the first end for the gaseous stream that is enriched in tritium. The system can also include a cooling system in communication with an interior of the enrichment column and a thermal cycling absorption column that is in fluid communication with the enrichment column. The thermal cycling absorption column can separate the tritium from the gaseous stream by use of a material that preferentially absorbs tritium at an absorption temperature.

In some embodiments, the system can also include a second enrichment column that is in fluid communication with the thermal cycling absorption column. The second enrichment column can be configured for parallel operation with the first enrichment column, for instance parallel and counter-current operation such that one column is in the water purification stage while the other column is in the regeneration stage.

BRIEF DESCRIPTION OF THE FIGURES

A full and enabling disclosure of the present invention, including the best mode thereof, directed to one of ordinary skill in the art, is set forth in the specification, which makes reference to the appended figures, in which:

FIG. 1A illustrates elements of an enrichment column that can be utilized in a purification stage of the separation process.

FIG. 1B illustrates a concentration profile for tritium retained within an enrichment column following a purification stage of a process.

DETAILED DESCRIPTION

Figure 2:
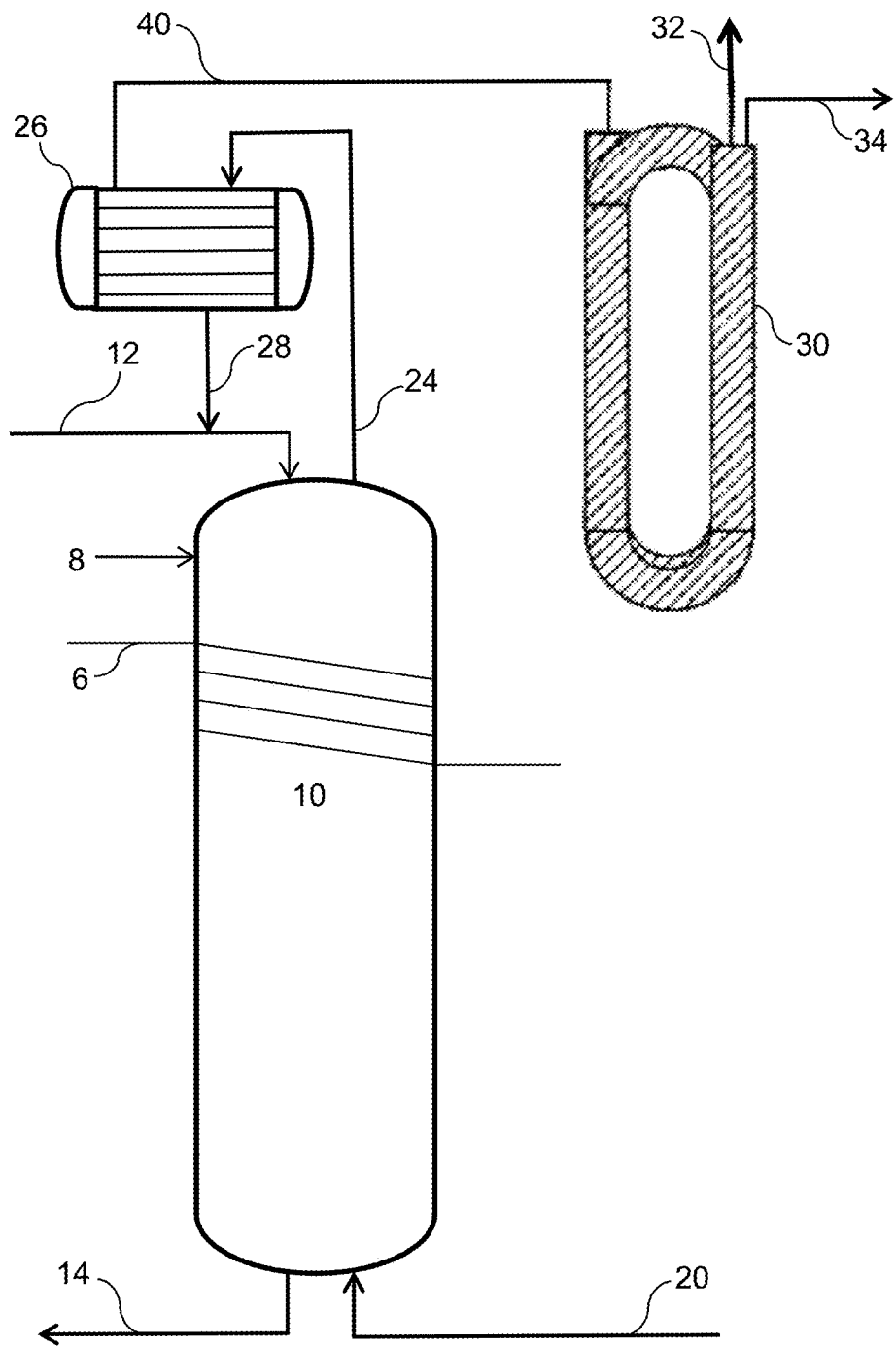
FIG. 2 illustrates an enrichment column including elements for use in a purification stage as well as elements for use in a regeneration stage.

It is to be understood by one of ordinary skill in the art that the present discussion is a description of exemplary embodiments only and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, disclosed herein are improved methods and systems for separating and concentrating tritium from an aqueous stream. The separation method is a multistage method that includes a first purification stage during which tritium of a tritium-contaminated aqueous stream is adsorbed onto a separation phase of an enrichment column, thereby purifying the aqueous stream. The method includes a second stage during which the adsorbed tritium is exchanged with hydrogen and/or deuterium in a gaseous stream to regenerate the enrichment column and provide a gaseous stream with a high tritium concentration. During a third stage of a process, the tritium of the gaseous stream can be separated from the gaseous stream as a gaseous tritium product.

The methods and systems can include various improvements over previously known tritium removal approaches that can improve efficiency of tritium recovery, as well as can lower operating costs of the systems. For instance, disclosed systems can exhibit an isotopic separation factor for tritium of about 1.2, or even higher in some embodiments, which is a great improvement over previously known water distillation approaches that have a separation factor of about 1.056. For comparison, a system having an isotopic separation factor of 1.2 can reach a decontamination factor of 1,000 after 38 stages, while a system having an isotopic separation factor of 1.056 will only reach a decontamination factor of 8 after 38 stages.

Improvements to previously known multistage separation systems, and methods can include one or more of utilization of a chilled column during a purification stage, utilization of a wet column, modification of separation materials, and ambient conditions during regeneration, among others. Disclosed systems and methods can eliminate the energy intensive temperature swings of previously known water distillation and energy intensive electrolysis approaches (e.g., CECE), and through utilization of multiple semi-continuous batch columns, disclosed systems can be scaled up and operated as a continuous process for thousands of tons of contaminated water per day. Disclosed systems and methods can show significant improvement over water distillation and CECE processes as are known in the art.

The purification stage of disclosed processes, during which tritium is preferentially adsorbed to a separation phase of an enrichment column from an aqueous feed, can serve to greatly increase the concentration of tritium on the separation phase as compared to that of the aqueous feed. As such, the gaseous stream that exits the enrichment column upon regeneration of the column in the second stage of a process can have a high tritium concentration. This can provide for very high tritium recovery during a gaseous tritium separation stage of the process. Moreover, the initial stage that includes enrichment of tritium on the separation phase can greatly improve throughput, further increasing the processing capacity of a system.

As disclosed systems are easily scalable for either high volume or low volume throughput, systems can be designed for any size facility. Moreover, the throughput of an existing system can be modified through relatively simple addition or removal of enrichment columns to a previously existing system providing a modular approach for facility design and update.

Referring to FIG. 1A, one embodiment of an enrichment column 10 is illustrated. In this view, elements of a column for use during an initial purification stage are shown. During a first purification stage, an aqueous stream 12 including tritiated water (HTO) can be purified to remove the tritium from the stream. The system can include a liquid inlet for feeding the aqueous stream 12 into the enrichment column 10. While illustrated with the aqueous stream 12 feeding into the column 10 at the top of the column 10, it should be understood that the flow through the column during a purification stage can alternatively be in the opposite direction, i.e., from the bottom of the column to the top.

Figure 4:
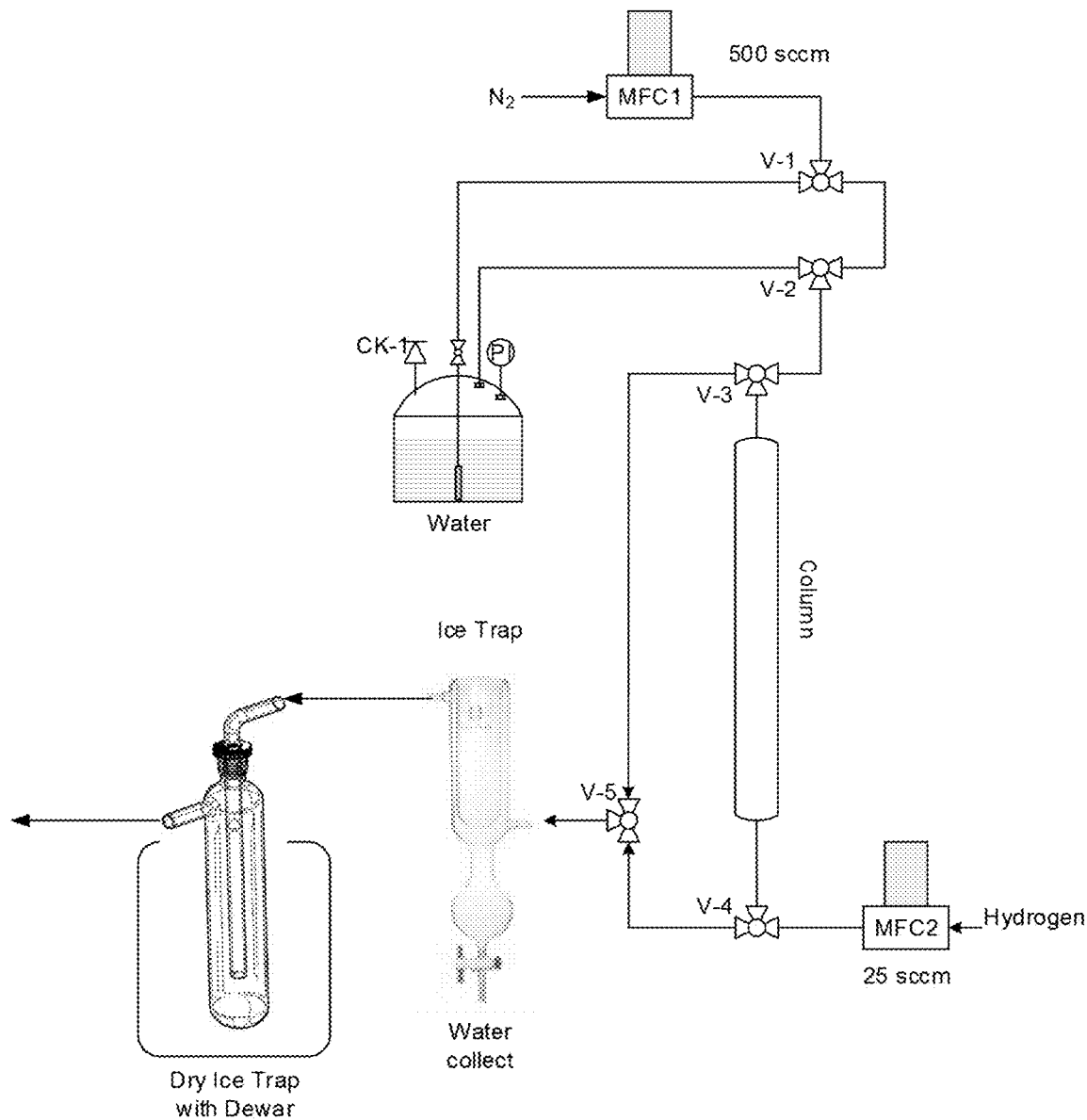
FIG. 4 provides a schematic of a vapor phase testing apparatus as described further herein.

The aqueous stream 12 can include tritium-contaminated water in either a vapor or liquid form and can be combined with a carrier gas, e.g., nitrogen, helium, argon, air, etc. For instance, in one embodiment, the aqueous stream 12 can be formed by bubbling a carrier gas through a liquid source of the tritium-contaminated water and thereby form an aqueous stream in which the tritium-contaminated water is in the form of a vapor with the carrier gas. An example of such an embodiment is illustrated in FIG. 4, in which a nitrogen carrier gas is bubbled through a container within which is contaminated water to form a vapor stream that can then be fed to an enrichment column, e.g., via valves V-2 and V-3 in FIG. 4. The flow rate of the carrier gas through the liquid source can be varied, for instance, from about 200 sccm to about 800 sccm in some embodiments, but can generally be such that the aqueous stream 12 is at or near saturation of the vapor at the operating conditions of the enrichment column, e.g., within about 10% of the saturation partial pressure of water at the operating conditions of the enrichment column during the purification stage. For instance, at an enrichment column operating temperature of about 25° C. during a purification stage, an aqueous stream 12 can include the tritium-contaminated water vapor at a partial pressure of about 20 Torr (about 2.5 kPa).

Figure 14:
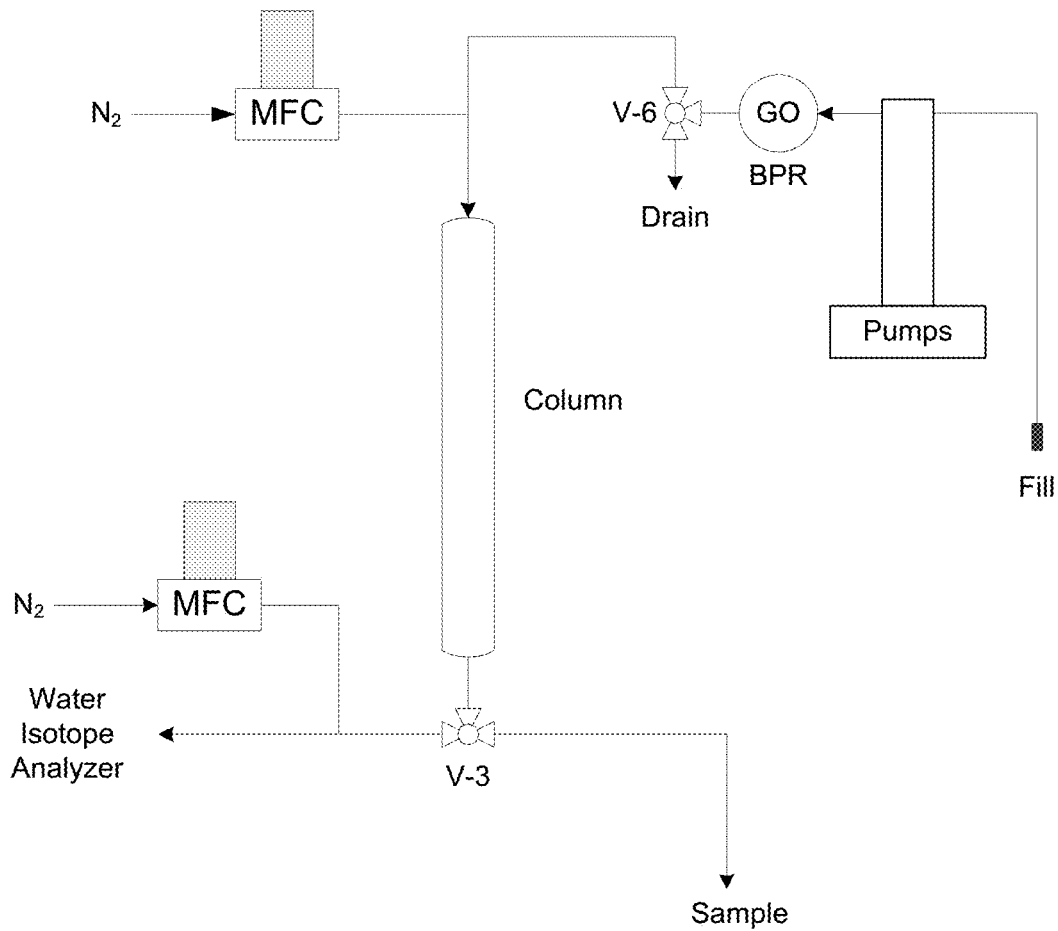
FIG. 14 provides a schematic of a liquid phase testing apparatus as described further herein.

In another embodiment, the aqueous stream 12 fed to the enrichment column 10 can include the tritium-contaminated water as a liquid rather than a vaporous feed. In such an embodiment, the tritium-contaminated water can be fed, e.g., injected, into an enrichment column 12 in conjunction with a carrier gas. One embodiment of such a system is illustrated in FIG. 14. Upon combination with the carrier gas, the liquid feed of the tritium-contaminated water can be vaporized at least somewhat, and the flow rate of the carrier gas can be varied so as to ensure that the combined streams can include the tritium-contaminated water at or near the saturation partial pressure of water (e.g., within about 10%) at the operating conditions of the enrichment column during the purification stage.

The contaminated water to be treated can be pre-treated prior to formation of an aqueous stream 12. For instance, in those embodiments in which the contaminated water originates from an open environmental source, such as seawater, the contaminated water from the source can be deionized prior to combining with a carrier gas and proceeding with a decontamination process.

An enrichment column 10 can be sized to process any desired volume of tritium-contaminated water, for instance, a high volume of about 500 tons per day or greater, about 800 tons per day or greater, or about 1000 tons per day or greater, in one embodiment. Accordingly, the enrichment column can be designed to accommodate the desired capacity. For example, the enrichment column can have an inside diameter of about 5 feet or greater, or about 6 feet or greater, and can have a height of about 50 feet or greater, about 60 feet or greater, or about 70 feet or greater, in one embodiment. Of course, the dimensions of the enrichment column are not critical to the system and can be varied to accommodate any particular system and the dimensional design of an enrichment column would be well within the abilities of one of skill in the art.

The system and method can effectively treat high volumes of contaminated water having a low concentration of tritium contaminant. For instance, the contaminated water can include tritium at a concentration on the order of parts per billion or parts per trillion. By way of example, the system can treat a contaminated water stream including a tritium contaminant at a concentration of about 1 part per billion (ppb) or less, about 500 parts per trillion (ppt) or less, or about 100 ppt or less. In one embodiment, the contaminated water can include tritium in a concentration of about 20 ppt or less.

A separation phase can be carried within the enrichment column 10. The separation phase can preferentially adsorb tritiated water as the liquid stream passes through the column and thus load the tritiated water on the separation phase, for instance via liquid phase surface water exchange. The separation phase can have an isotopic separation factor at the separation conditions of an enrichment column, for instance, about 1.2 or greater in one embodiment. As utilized herein the term 'isotopic separation factor' $\alpha$, is defined with reference to FIG. 1A as $$\alpha = [C'/(1-C')]/[C''/(1-C'')],$$

in which C' and (1−C') are the relative concentrations of $H_2O$ and HTO, respectively, in an enriched mixture at the outlet 15 of a finite separation stage 11 of enrichment column 10, and C'' and (1−C'') are the corresponding quantities in the starting mixture at the inlet 13 of the finite separation stage 11.

As is known, a single column 10 can be considered to have multiple individual separation stages 11 or equivalent (e.g., tens, hundreds or even thousands of individual finite separation stages).

A separation phase can be a high surface area material. A separation phase can generally have a large surface area, e.g., about 100 square meters per gram ($m^2/g$) or greater, about 200 $m^2/g$ or greater, or about 300 $m^2/g$ or greater. In addition, a separation phase can include porous materials and the average pore diameter can generally be on the order of about 500 Angstroms (Å) or less, for instance, about 100 Å or less, or about 10 Å or less, in one embodiment.

Specific materials as may be utilized as the separation materials can include, without limitation, aluminas, silicas, silica-alumina, other metal oxides, and zeolites (also commonly referred to as molecular sieves). For instance, zeolites can include Type A zeolites, Type X zeolites, or type Y zeolites or combinations thereof. Representative separation materials can include, without limitation, NaY zeolite, type 3A zeolite, type 4A zeolite, type 5A zeolite, type 13X zeolite, type HY zeolite, mordenite zeolite, ZSM-5 zeolite, aluminum oxide ($Al_2O_3$), silicon dioxide ($SiO_2$) or any combination thereof.

The separation phase can include one or more functional groups and/or associated molecules that can encourage adsorption of tritium and/or tritiated water at the surface of the separation phase. For example, the separation phase can include hydroxyl groups at the surface of the material which can encourage the isotopic exchange of tritium with the protium of the hydroxyl groups as well as liquid phase exchange of HTO with water adsorbed to the surface of the separation phase.

In one embodiment, the separation phase can be hydrated, and can include water molecules that can be exchanged with tritiated water molecules during the first stage of the process. Such materials have been described, e.g., in *Journal of Nuclear Science and Technology*, 45(6), 532 (2008), and in U.S. Pat. No. 6,632,367 to Furlong, et al., which are incorporated herein by reference. According to this embodiment, the separation material can include metal ions or other ions that can have associated therewith water molecules of hydration. For instance, the separation material can include a cationic portion that can be associated with one or more water molecules. Cationic portions can include, without limitation, ammonium cations or metal cations such as aluminum, magnesium, copper, zinc, cobalt, or chromium.

It is general knowledge that the materials having large numbers of surface hydroxyl group or can have hydration water are hydrophilic in nature. In some embodiments, the separation phase can be loaded with water prior to contact between a tritium-contaminated aqueous stream and the separation phase. For instance, a wet column can be prepared by injecting water into a column 10, for instance via a water injection port 8, prior to feeding the aqueous stream 12 to the column 10. In general, an enrichment column can be considered to be a wet column when an interior volume of the enrichment column 10 that contains the separation material is at or near full water saturation at the operating conditions of the purification stage, e.g., in which the water partial pressure within the column at operating conditions at initiation of a purification stage is such that the interior volume is about 90% of full water saturation or greater.

In some embodiments, a wet column can be provided at a purification stage through control of conditions during a regeneration step. For instance, a regeneration step can be carried out at a relatively low temperature which can allow water to remain within the column as surface hydroxyl groups at the surface of the separation phase. The more hydroxyl groups that remain on the separation phase following a regeneration stage, the wetter, the column can be at initiation of a purification stage, and the higher the capacity for the tritiated water removal during the following purification stage.

Prior to feeding the aqueous stream 12 to an enrichment column 10, the contents (in particular, the separation phase) of the column 10 can be cooled. For instance, the contents of an enrichment column can be cooled to a temperature of about 20° C. or less, about 15° C. or less about 10° C. or less, or about 4° C. or less in some embodiments while remaining above freezing point of water. The method used to cool the enrichment column is not particularly limited. In the embodiment illustrated in FIG. 1A, an enrichment column 10 can include a surrounding cooling line 6 that can surround all or a portion of the column 10. Flow of a cooling fluid through the cooling line 6 can then decrease the interior temperature of the enrichment column to a desired level prior to and during feeding an aqueous stream 12 into the column during a purification stage.

During the purification stage of a process, tritium of the input stream 12 can be adsorbed on to the surface of the separation phase and purified decontaminated water can exit the bottom of the enrichment column 10 at 14. For instance, the purified water stream that exits the bottom of the enrichment column 10 can be modified from a radioactivity level of input tritiated water of about 10,000 Bq/mL or more, about 30,000 Becquerel per milliliter or more, or about 60,000 (Bq/mL) or more to purified detritiated water having a radioactivity level of about 1000 Bq/mL or less, about 100 Bq/mL or less, or about 60 Bq/mL or less.

The adsorbed tritium of the enrichment column can describe a concentration profile as the tritium is adsorbed within the column 10. A typical concentration profile for tritium adsorbed within a column 10 is illustrated in FIG. 1B at 16, which illustrates the decreasing concentration of tritium from the top to the bottom of the enrichment column following the first stage of the process. Of course, in those embodiments in which the aqueous stream 12 is fed through a column in the opposite orientation, the tritium concentration profile will be reversed from that shown in FIG. 1B. The purification stage of the process can continue until the column effluent reaches radioactive breakthrough, e.g., radioactivity due to tritium reaches about 60 Bq/mL. Following radioactive breakthrough in the effluent 14, the flow of the aqueous stream 12 through the enrichment column 10 can be stopped and the second regeneration stage of the process can be carried out.

FIG. 2 illustrates the system of FIG. 1 including elements of the regeneration stage shown on the enrichment column 10. During the regeneration stage, a gaseous flow 20 including hydrogen gas can be fed to the bottom of the enrichment column. Alternatively, the gaseous flow can be fed to the top of the enrichment column and can exit out of the bottom of the column. In general, however, the gaseous flow 20 during a regeneration stage will be countercurrent to the aqueous flow 12 during a purification stage. The hydrogen gas can include protium, deuterium, or a mixture thereof in the form of $H_2$, $D_2$, and/or HD. During the regeneration stage, protium and/or deuterium of the gaseous flow 20 can exchange with tritium on the column to enrich the gaseous flow at the gaseous outlet in tritium and regenerate the separation phase for a following purification stage.

A catalyst can be included in the enrichment column 10 to encourage the exchange of the protium and/or deuterium for adsorbed tritium. The catalyst can be a component of the separation phase utilized in the purification stage or can be a separate material that is incorporated within the enrichment column in conjunction with the separation phase, as desired. For instance, a platinum catalyst can be loaded onto the separation phase utilized in the purification stage and can serve to catalyze exchange of tritium adsorbed to the separation phase in the purification stage with protium and/or deuterium of the gaseous regeneration flow through the enrichment column 10 during the regeneration stage. Other materials for use as a catalyst can include, without limitation, elements of Group VIII of the periodic table (Fe, Co, Ni, Ru, Rh, Pd, Os, Ir).

The flow rate of the gaseous regeneration flow 20 through the enrichment column 10 can vary. For example, in one embodiment, at a flow rate of about 52 liters per minute, a gaseous regeneration flow 20 through the enrichment column 10 can pick up about 100 parts per million (ppm) tritium.

Beneficially, it is not necessary to heat a gaseous flow 20 prior to feeding the gaseous flow 20 to the enrichment column. This can greatly decrease costs of a system as well as improve efficiency of the system as utilization of a gaseous flow 20 at ambient conditions can allow for retention of water in the enrichment column 10 and, as discussed previously, utilization of a previously wetted separation phase during a purification stage can provide improvements to a system.

Upon the exchange of protium and/or deuterium for tritium on the separation phase, the regenerated enrichment column can again enter a purification stage of the process with initialization of flow of an aqueous stream 12 containing tritium-contaminated water through the column 10. Thus, the system can provide a self-regenerating enrichment column, which can decrease down time of a system and provide additional cost savings and other added benefits.

The gaseous flow that is enriched in tritium 24 can exit the enrichment column and can be further processed for recovery of tritium from the flow. For instance, the tritium-enriched gaseous flow 24 can be passed through a condenser 26 and water recovered from the stream can be recycled 28 to the aqueous flow 12 of the first stage of the process, or alternatively, can be fed to injection port 8 and used to wet the enrichment column 10.

Figure 3:
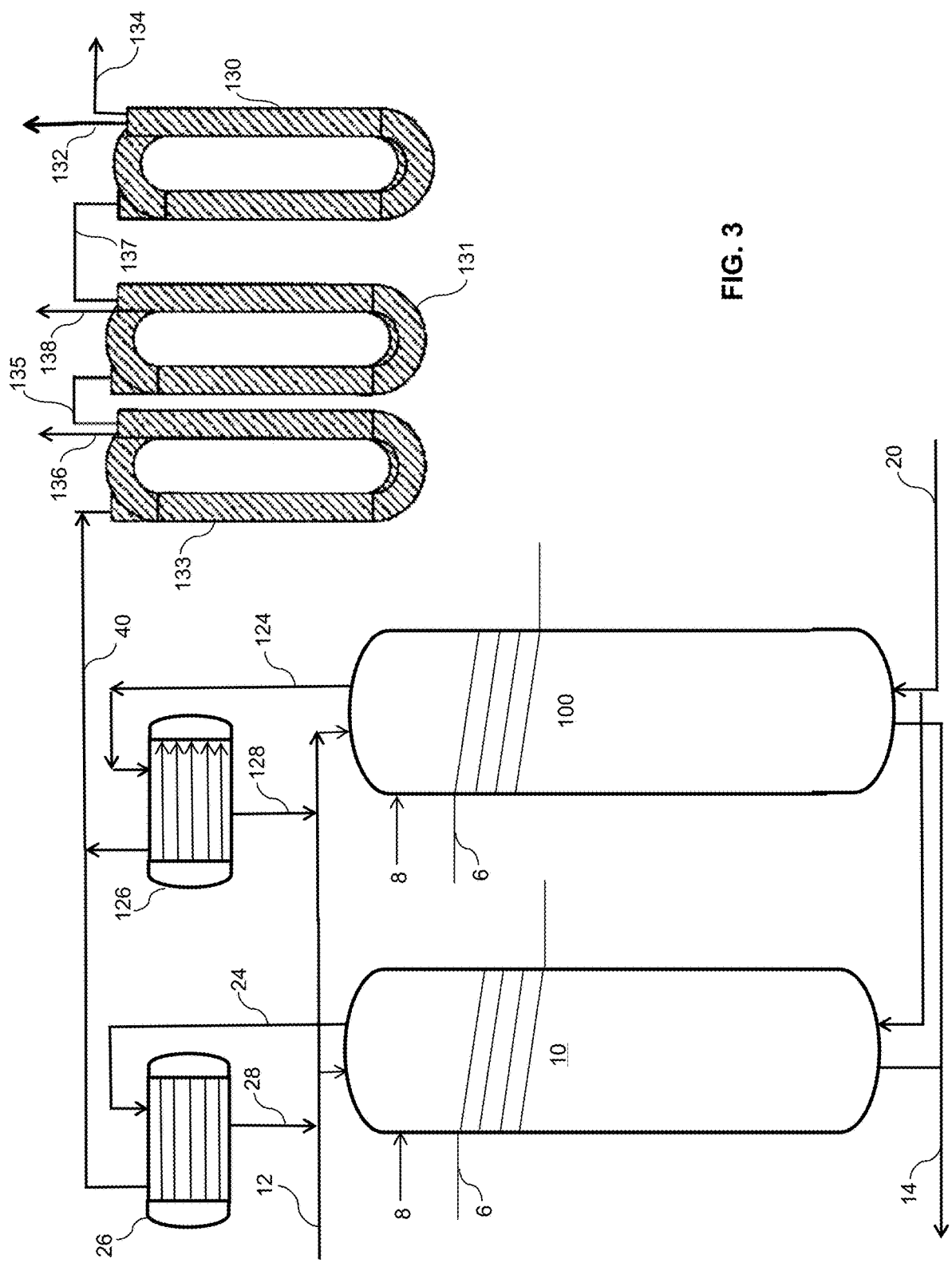
FIG. 3 illustrates one embodiment of a system as may be utilized in a separation process.

As illustrated in FIG. 3, in one embodiment, a system can include two (or more) enrichment columns 10, 100 that can operate parallel to one another and in opposite stages to one another. For instance, a first enrichment column 10 can be operating in the purification stage of a process, and a second enrichment column 100 can be simultaneously operating in a regeneration stage of a process. In such a fashion, a gaseous flow 24, 124 that is enriched in tritium can be passing through a condenser 26, 126 to separate excess water 28, 128, at one or the other of the enrichment columns 10, 100, and the overall output from the system can be continuous. Meanwhile, an aqueous stream 12 can be fed to the other of the two columns 10, 100 to produce a purified stream 14 from that column. Additional enrichment columns can be included to further increase throughput and the rate of continuous removal of enriched tritium from a system.

A tritium-enriched gaseous flow 40 can include tritium in a relatively high concentration, for instance, about 5 ppm or greater, about 10 ppm or greater, or about 100 ppm or greater. The enriched gaseous flow 40 can be further processed for recovery of tritium in a third stage of the process, for instance, according to a thermal cycling absorption process (TCAP) as is known in the art. One embodiment of a TCAP that may be utilized has been described in U.S. Pat. No. 8,470,073 to Heung, et al., which is incorporated herein by reference. The system of FIG. 2 illustrates one embodiment of a TCAP as may be incorporated in a system. In this embodiment, an inverse column 30 can be utilized that can separate the enriched gaseous flow 40 into a tritium stream 32 and a hydrogen stream 34.

According to one embodiment, an inverse column 30 can include an absorbent that preferentially absorbs the heavier hydrogen isotope. That is, the absorbent of the column 30 absorbs tritium better than deuterium, and deuterium better than protium. During use, the column 30 can be heated and cooled to cycle the temperature between a low temperature and a high temperature. The specific temperatures of the cycle can vary depending upon the specific absorbent used. For instance, in one embodiment, the column can be cycled between about 90° C. and about 180° C. At the lower temperature, the inverse column 30 can preferentially absorb the heavier isotope(s) of hydrogen, and at the higher temperature, the absorbed isotopes can be released. The amount of the heavy hydrogen isotope that is absorbed by the column can vary depending upon flow rate and pressure of the gas as is known.

Absorbents for use in an inverse column 30 can include organic or inorganic absorbents as would be known to one of skill in the art. By way of example and without limitation, inorganic absorbents can include molecular sieves (i.e., a zeolite), activated carbon, metal oxides (e.g., alumina, silica, silica-alumina, etc.), clays, or mixtures of materials. Molecular sieves as may be utilized can include, for example, type 3A, type 4A, type 5A, type X, type Y, ZSM-5, Mordenite, type L, Omega, or other types having 3-10 Angstrom pore diameters that preferentially absorb the heavier hydrogen isotopes. Transition metals such as vanadium and chromium and their alloys that can preferentially absorb hydrogen isotopes and have isotopic effect similar to the molecular sieves can also be used. Organic absorbents can include, without limitation, styrene divinyl benzene or other crosslinked vinyl copolymers as long as they are hydrophilic. One skilled in the art could readily identify other combinations of support/sorbent materials and catalyst materials as may be utilized in an inverse column 30. It should be understood that separation materials of disclosed systems are not limited to the specific materials mentioned herein.

During use, an inverse column 30 can be alternatively heated and cooled. During the cool cycle, tritium of an enriched gaseous flow 40 can be preferentially absorbed by the inverse column 30, and the output line 34 can contain primarily the lighter isotope(s). During the hot cycle, the absorbed material can be released, and the output line 32 can contain primarily the heavier isotope (tritium).

As previously stated, the gaseous flow input 20 to a regeneration stage can optionally include deuterium in conjunction with hydrogen. In this embodiment, it may be desired to separate all three isotopes from one another to obtain three product lines: one including primarily protium, one including primarily deuterium, and one including primarily tritium. One such embodiment is illustrated in FIG. 3 in which a third stage of the process can include multiple separation columns 130, 131, 133 that can, together, separate the three isotopes from one another.

According to one embodiment, the first and second separation columns 131, 133 can incorporate an absorbent that preferentially absorbs the lighter hydrogen isotopes and thus has the opposite isotopic effect of an inverse separation column 30 as described above. For instance, first and second separation columns 131, 133 can incorporate a palladium absorbent that absorbs the hydrogen isotopes in order by preference of protium>deuterium>tritium. In addition, the absorbent of the first and second separation columns 131, 133, can absorb protium and deuterium at a low temperature and release the absorbed isotopes at an increased temperature.

The absorbent, e.g., palladium, can be supported on an inert support material, such as diatomaceous earth (also known as kieselguhr), which does not directly absorb or separate hydrogen isotopes but can function as support for the absorbent (e.g., palladium) to increase reaction kinetics and reduce pressure drop as the gas flows through the columns 131, 133.

When utilizing a palladium absorbent, the separation columns can be cycled from a low temperature of about 90° C. to a high temperature of about 180° C. At the lower temperature, hydrogen is absorbed onto the absorbent, with preference for protium absorption, and at the higher temperature, the absorbed materials are released from the absorbent.

During a process, and with reference to FIG. 3, the enriched gaseous flow 24, 124 from the enrichment columns 10, 100 can pass through a condenser 26, 126, with water 28, 128 being removed from the flow and returned to the enrichment column 10, 100 with the contaminated water flow 12 to be processed by the system. The enriched gas flow 40 that exits the condensers 26, 126 can flow to the first separation column 133, which can contain an absorbent that preferentially absorbs the lighter hydrogen isotopes. During the cold portion of the cycle, protium can be preferentially absorbed with the column 133, and the exit stream 135 from the column 133 can include deuterium and tritium of the gas flow 40 as well as any protium that was not absorbed within the column 133. During the hot portion of the cycle, the absorbed protium can be released from the absorbent and a product stream 136 that includes primarily protium can be obtained.

The stream 135 that exits the first separation column 133 can enter the second separation column 131 and the process of the first separation column 133 can be repeated to separate any remaining protium from the feed stream 135. Thus, the exit stream 137 from the separation column 131 that exits the column during the cold phase of the cycle will include deuterium and tritium, and the exit stream 138 that exits the separation column 131 that exits the column during the hot phase of the cycle will include protium.

The third separation column 130 can include an absorbent that preferentially absorbs tritium during the cold phase of the cycle. Thus, the exit stream 134 that exits the inverse column 130 during the cold phase of the cycle can include primarily deuterium, and the exit stream 132 that exits the inverse column during the hot phase of the cycle can include primarily tritium.

A system as described herein can separate and recover about 95% or greater, about 97% or greater, or about 99% or greater of the tritium contained in a contaminated aqueous stream that is treated by the multistage process. In addition, the system can recover a relatively pure tritium. For instance, when considering a system that can process about 1000 tons per day of contaminated water that includes a tritium contaminant in an amount of about 17 ppt, a tritium product can be obtained in an amount of from about 40 std cc of tritium ($T_2$) per day, representing a 95% recovery of the tritium contained in the contaminated stream. The purified water obtained in the first stage of the process can include less than about 60 Bq/mL radioactivity from tritium, and the light hydrogen isotope product(s) (i.e., protium and optionally deuterium) can include less than about 1 ppm tritium.

Tritium that is separated and recovered according to the disclosed process and system can be suitable for any use as is known in the art. For instance, the recovered tritium can be utilized in self-powered lighting applications as a replacement for radium, as a fuel for controlled nuclear fusion reactions, or as a chemical tracer, for instance, as a radiolabel or as a tracer in ocean circulation and ventilation.

The disclosure may be better understood by reference to the Examples, set out below.

Example 1

Unless indicated otherwise, a base experiment condition was set up in a column using ½" OD, 0.035" wall thickness, and 12" long stainless tubing, with internal volume about 28 cc. The columns were packed with separation/catalyst materials ranging from 15 g to 25 g, depending on the density of the particular material used.

Once filled, a packed column was dried with nitrogen at 550° C. and cooled to ambient temperature for a test. Nitrogen gas supplied via a mass flow controller (MFC1) at 500 sccm flow rate was utilized as a carrier gas to bubble deionized (DI) water into the column such that the stream carried almost 20 torr moisture partial pressure at ambient conditions (22° C., 750 torr barometer pressure) for a water isotope separation test with vapor phase moisture and downflow orientation.

The moisture from the DI water was the feed to the column. The DI water included 152 ppm deuterium (D/H molar ratio) from nature abundance. FIG. 4 shows a schematic of the laboratory setup. Three-way valves (V-1 and V-2) were built in to bypass the water bubbler for column drying. V-3 and V-4 were used to bypass the column in order to sample feed composition via V-5.

Column regeneration with hydrogen was performed with hydrogen from MFC-2 to V-4, through the column, and then V-3 to V-5 for analysis.

The column effluent moisture was collected with 2-stage cold trap for deuterium analysis as shown. This was later changed to online analysis in later experiments.

Figure 5:
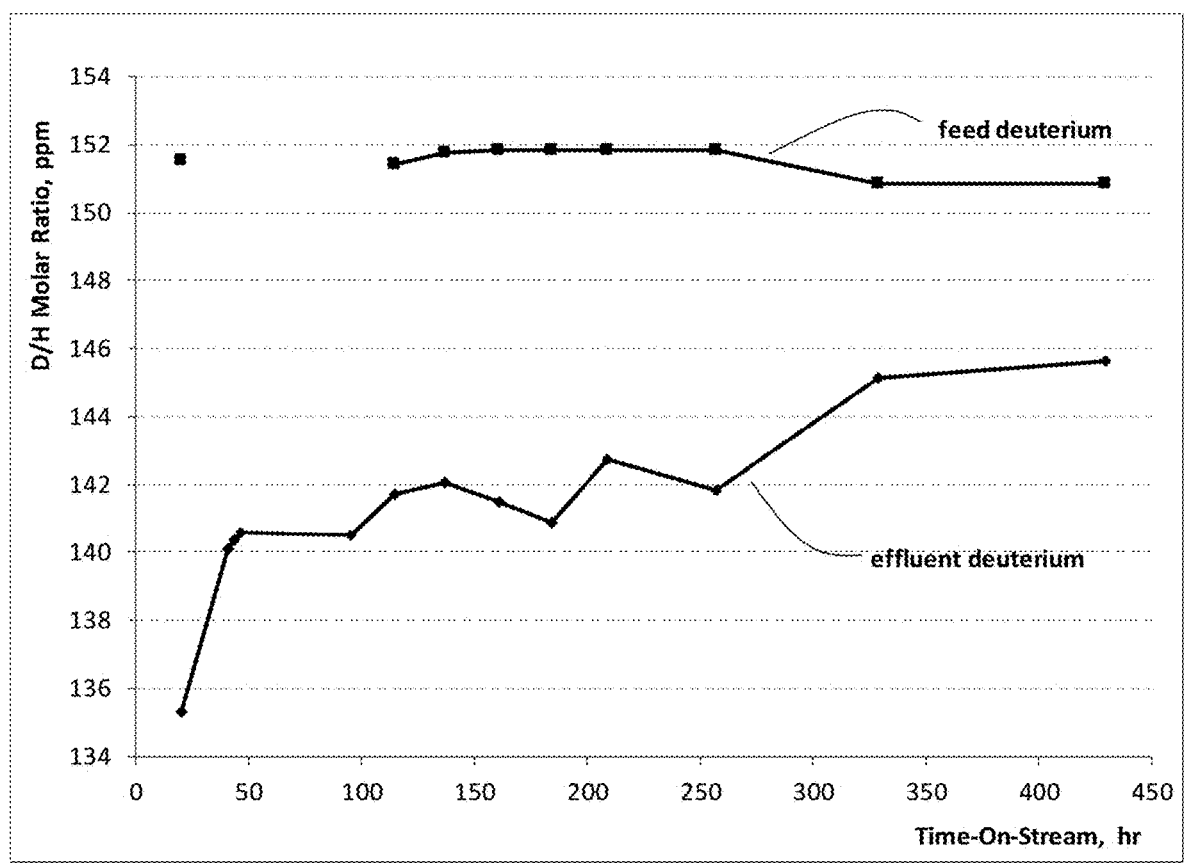
FIG. 5 graphically illustrates deuterium levels in the feed and effluent for an exemplary test system as described herein.

FIG. 5 shows performance for a water isotope separation using γ-alumina in the column. As can be seen, the effluent of the column showed deuterium concentration substantially lower (initial, 135 ppm) than that in the feed. The experiment continued for over 2 weeks and confirmed selective removal of deuterium. At the end of the test (425 hours), effluent deuterium was 145.5 ppm, which was still lower than 151 ppm in the feed.

Example 2

Figure 6:
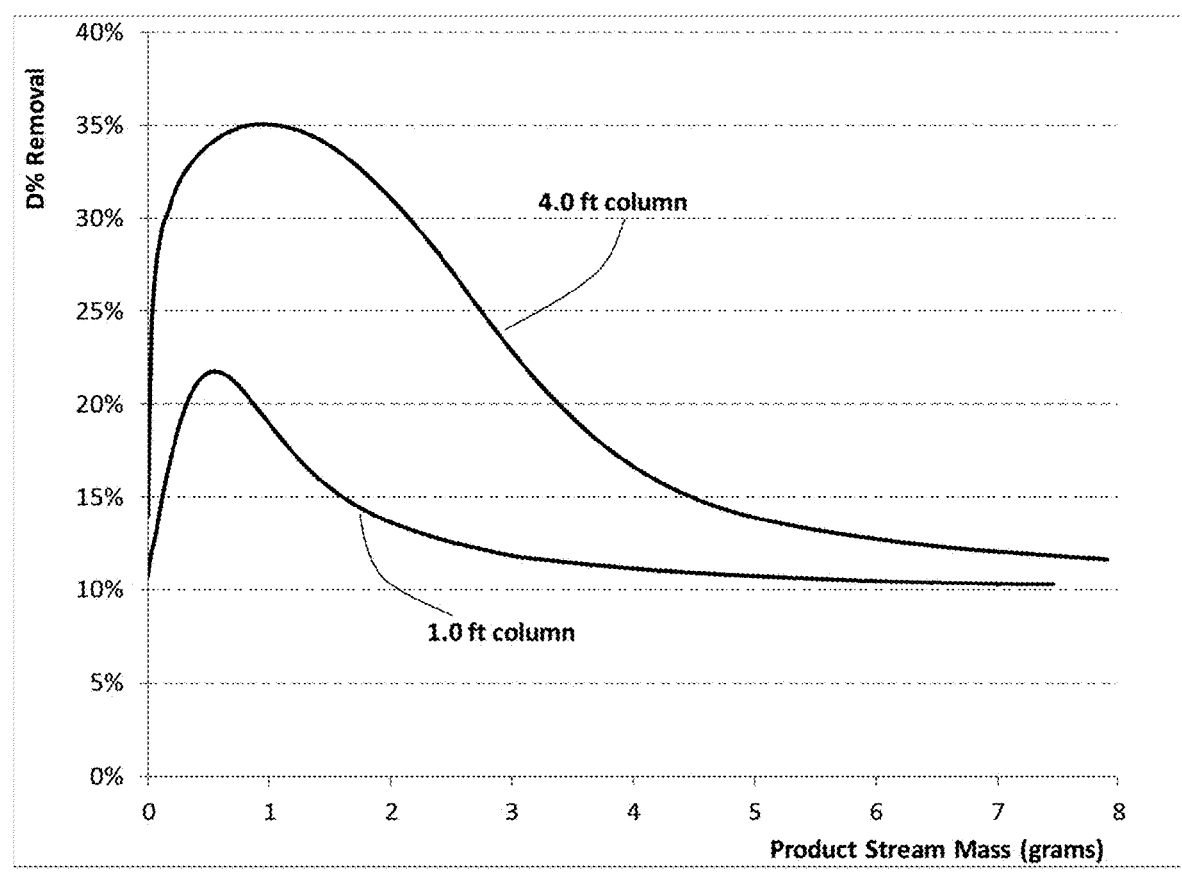
FIG. 6 compares the deuterium separation results for two different systems as described herein.

A 4-foot column was constructed using otherwise identical conditions as in Example 1. FIG. 6 compares the performance on deuterium removal between the 4-foot column and the 1-foot column. Note that the graph presents D % removal on y-axis and grams of moisture processed on x-axis. The feed was still the same DI water with 152 ppm deuterium. As indicated, the 4-foot column had higher D % removal than the 1-foot column illustrating column staging effects as expected.

Example 3

Figure 7:
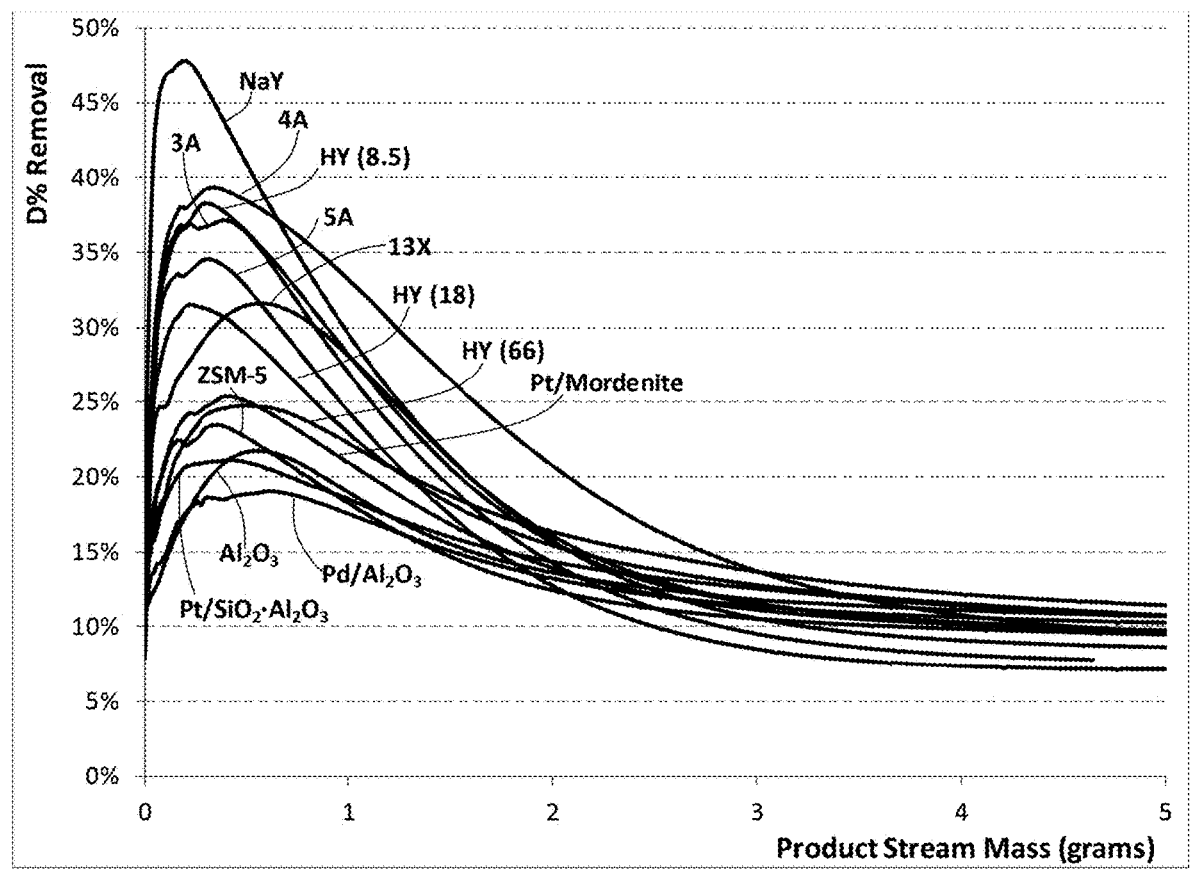
FIG. 7 compares the deuterium separation results for a system utilizing each of several different separation materials.
Figure 8:
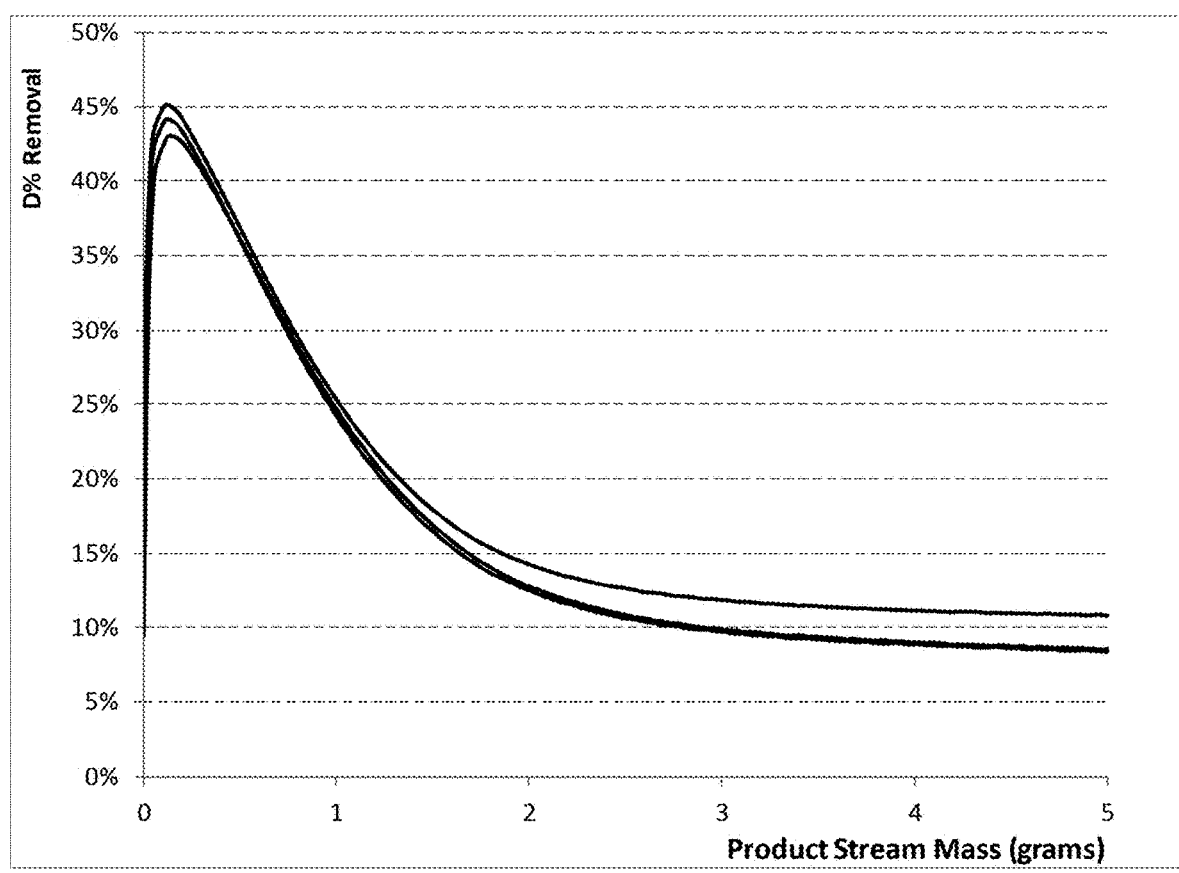
FIG. 8 illustrates the reproducibility of one of the separation materials of FIG. 7.

Multiple different separation/catalyst materials were examined for effectiveness utilizing the 1-foot column described in Example 1. Separation materials included the following:

NaY molecular sieve
3A molecular sieve
4A molecular sieve
5A molecular sieve
13X molecular sieve
HY molecular sieve (8.5 $SiO_2/AlO_3$ ratio)
HY molecular sieve (18 $SiO_2/AlO_3$ ratio)
HY molecular sieve (66 $SiO_2/AlO_3$ ratio)
Pt/Mordenite
ZSM-5 molecular sieve
aluminum oxide ($Al_2O_3$)
$Pd/Al_2O_3$
$Pt/SiO_2$—$Al_2O_3$ FIG. 7 shows the results. As can be seen, NaY had the highest removal, and $Al_2O_3$ and $Pd/Al_2O_3$ had the lowest values. As indicated in FIG. 8, NaY as packing material demonstrated excellent reproducibility of the test (each column was packed independently).

Figure 9:
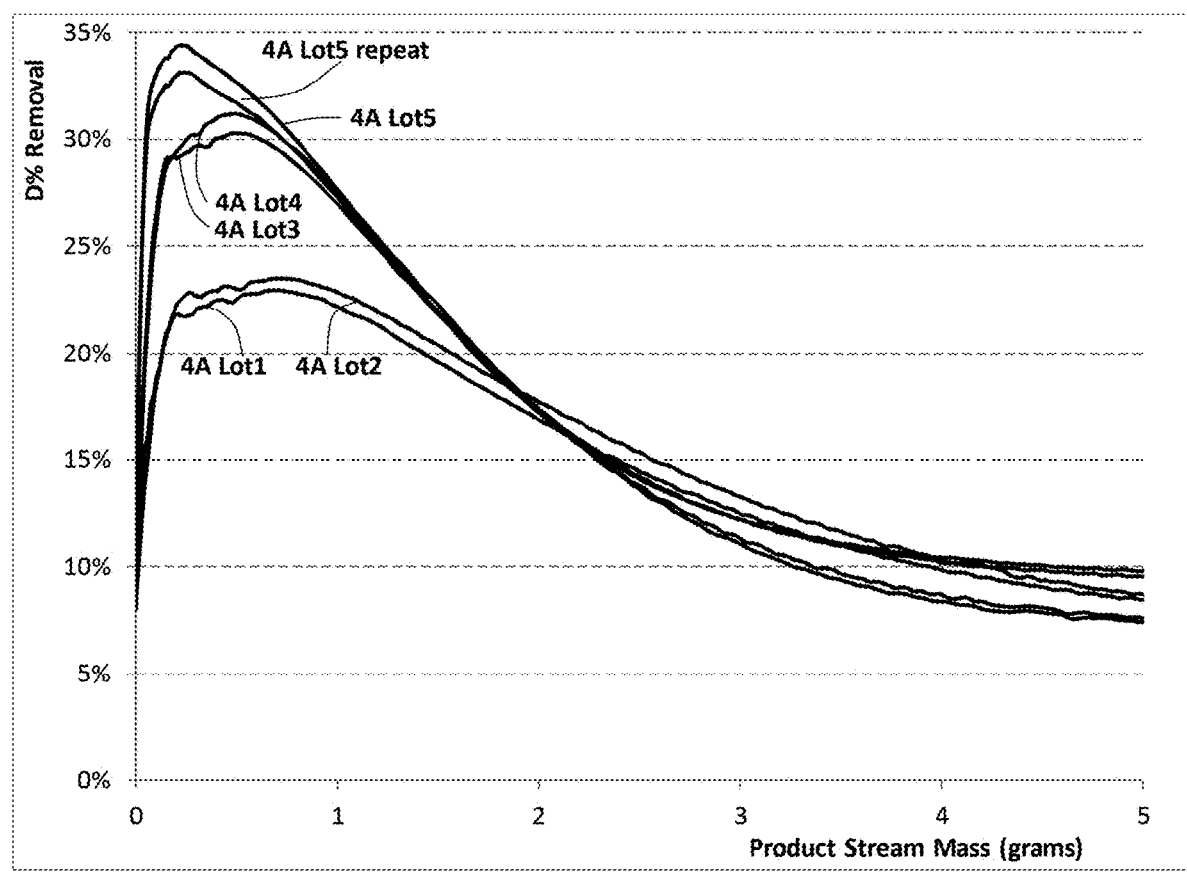
FIG. 9 illustrates differences in deuterium separation results for one of the separation materials of FIG. 7 based on lot numbers or source of the separation material.

4A zeolites from different lot numbers or vendor were examined for reproducibility. The results are shown in FIG. 9. As shown, the 4A zeolites from different lots/sources were found to perform differently. As seen in FIG. 9, the 4A performance could be segregated into 3 groups: Lot 1 and Lot 2; Lot 3 and Lot 4; and Lot 5. The performance of Lot 5 was repeated once to confirm the experimental accuracy.

Figure 10:
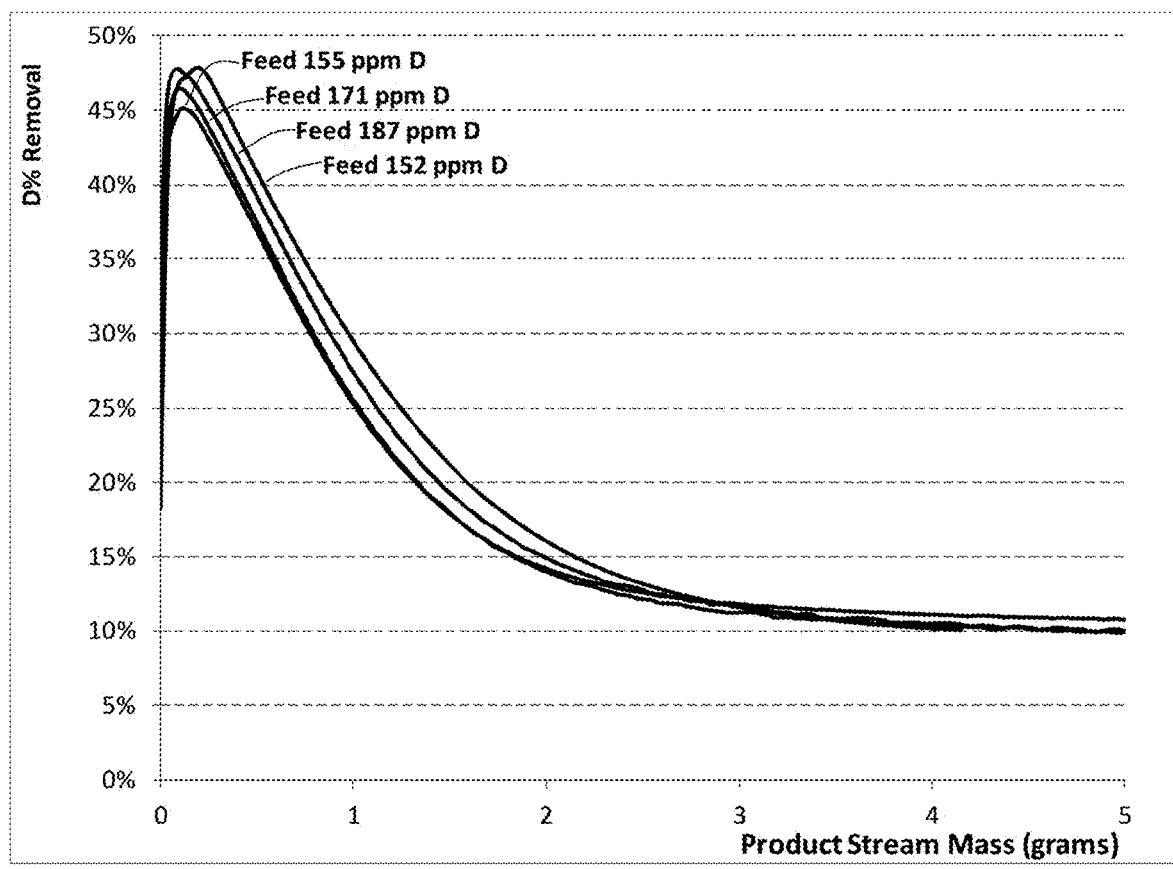
FIG. 10 compares deuterium separation results for different deuterium feed concentrations.

Samples run included adding a small amount of heavy water into the feed water as described above to provide feed with deuterium concentration varying from 152 ppm to 187 ppm. The separation material for all cases was the NaY zeolite. Results are shown in FIG. 10. As seen in FIG. 10, the NaY separation material behaved similarly for the various feed concentrations.

Figure 11:
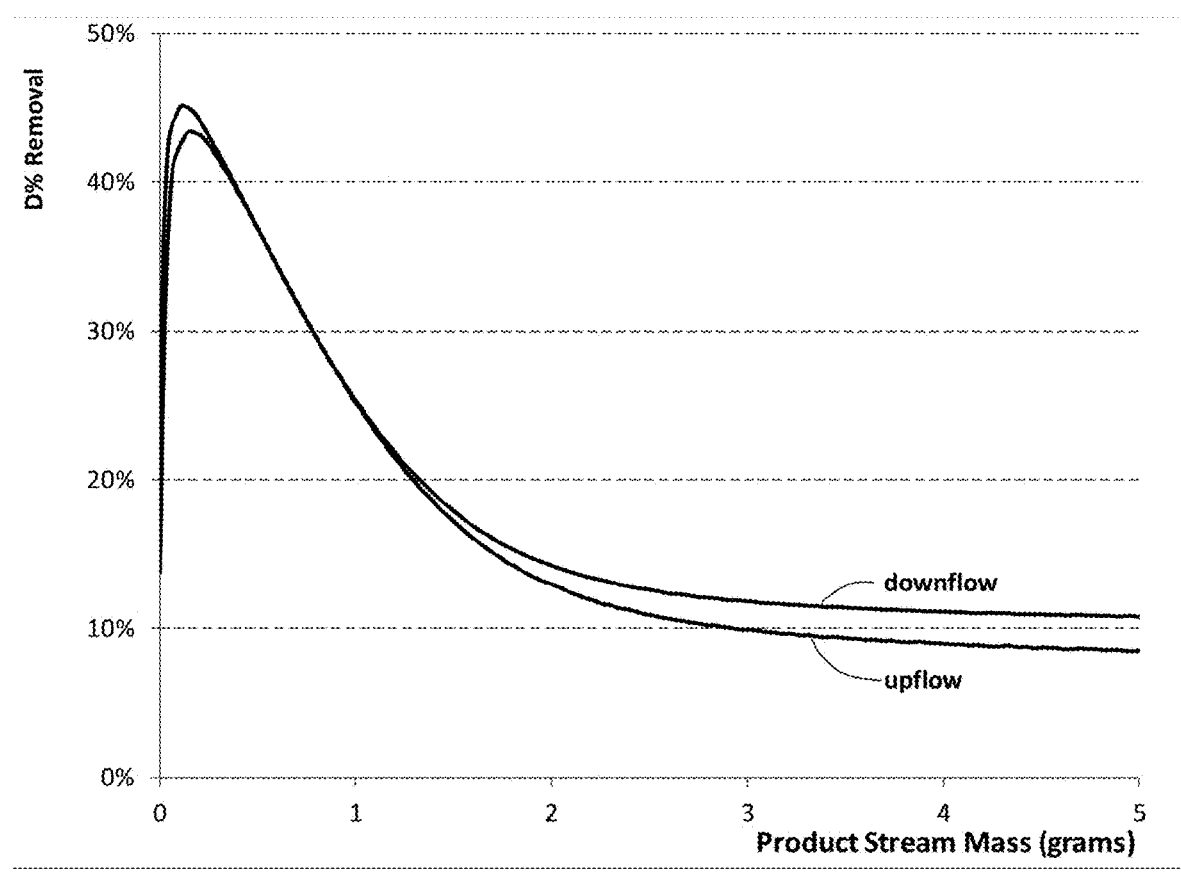
FIG. 11 compares deuterium separation results for a system in upflow vs. downflow orientations.

The NaY system was then run to compare upflow and downflow orientations. As shown in FIG. 11, the upflow and downflow orientations were confirmed to be comparable for NaY.

Figure 12:
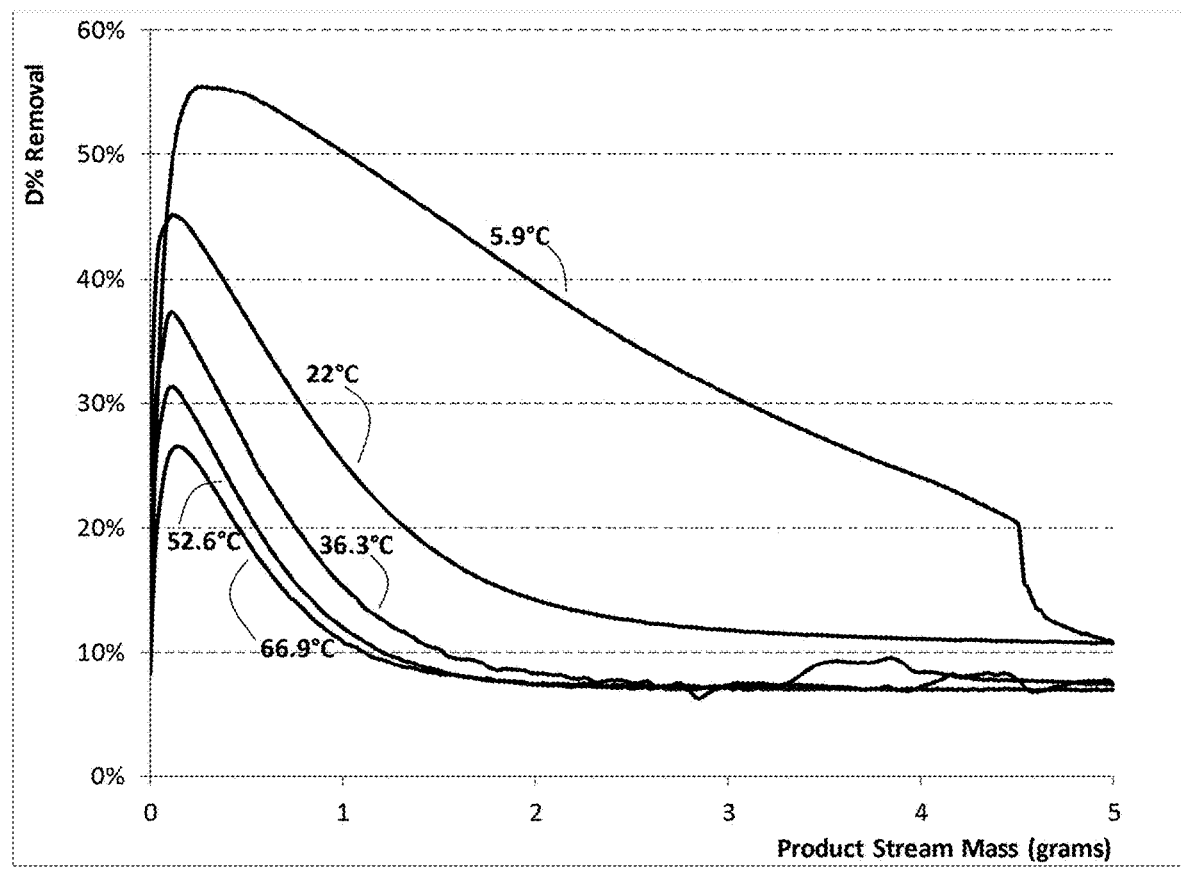
FIG. 12 compares deuterium separation results for a system run at different temperatures.

The NaY system was also examined for effect due to temperature change. When the column was chilled to 5.9° C., the performance using the NaY separation material was sharply better (FIG. 12) than at the other temperatures examined. The curve integration for total deuterium removal at 5.9° C. was 4 times better than the test at ambient condition at 22° C. On the other hand, performance decreased at higher column temperatures (FIG. 12).

Figure 13:
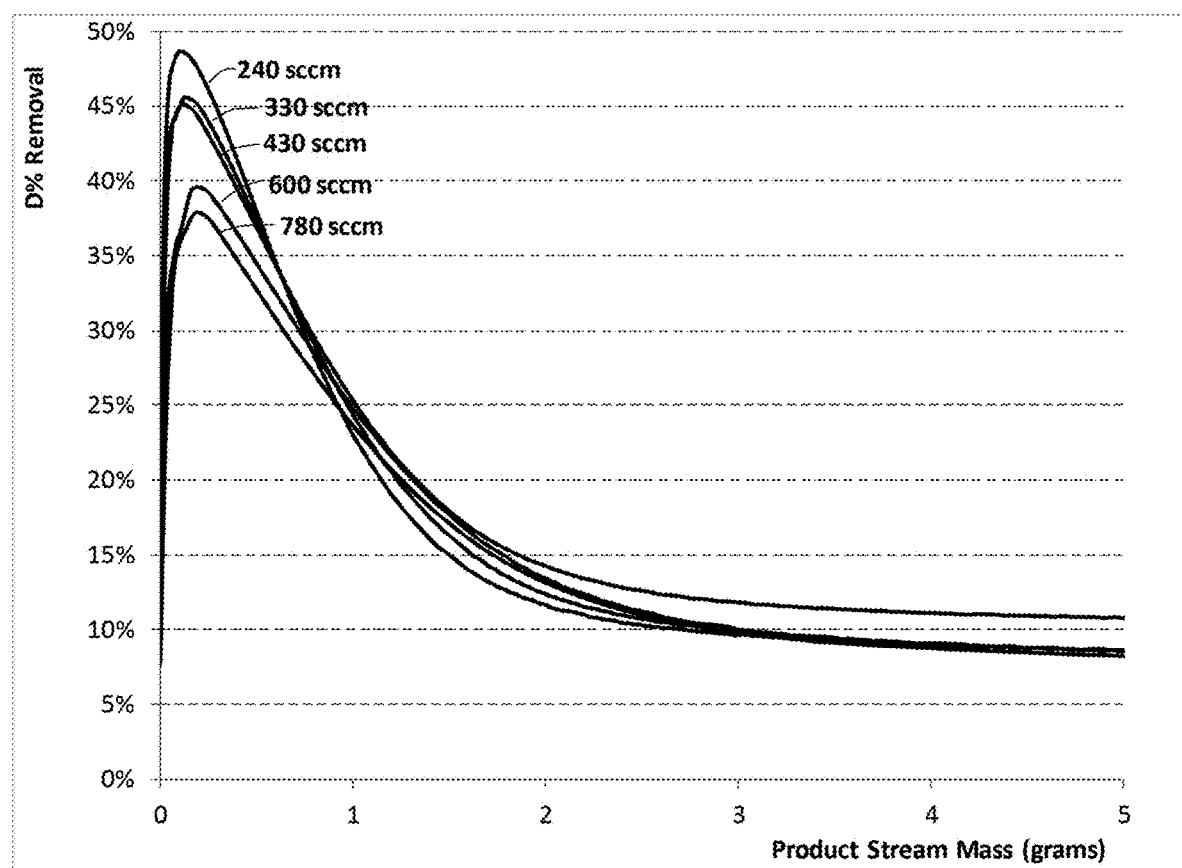
FIG. 13 compares deuterium separation results for a system run at different carrier gas flow rates.

Various nitrogen carrier gas flow rates were also examined. As shown in FIG. 13, the system performed slightly better at the lower flow rate of 240 sccm than at the highest flow rated tested of 780 sccm (FIG. 13). This is an indication of kinetic effects on the system. When plotted on an Hour-On-Stream scale (not shown), the curves were much different, but the accumulated amount of moisture processed was close, as indicated in FIG. 13 when plotted in grams of moisture processed. The similarity indicates the separation material's capacity for water isotope separation until saturation with deuterium. The slightly better performance at the low flow rate of 240 sccm indicates that isotope exchange was closer to equilibrium, while it was opposite with the higher flower rate of 780 sccm.

Example 4

A system as described in Example 1 was utilized, with liquid water containing deuterium at 152 ppm pumped into the column rather than vapor carried by a nitrogen carrier gas. In both upflow and downflow orientation, the column did not show any isotope separation, i.e., effluent had the same deuterium concentration as the feed.

Figure 15:
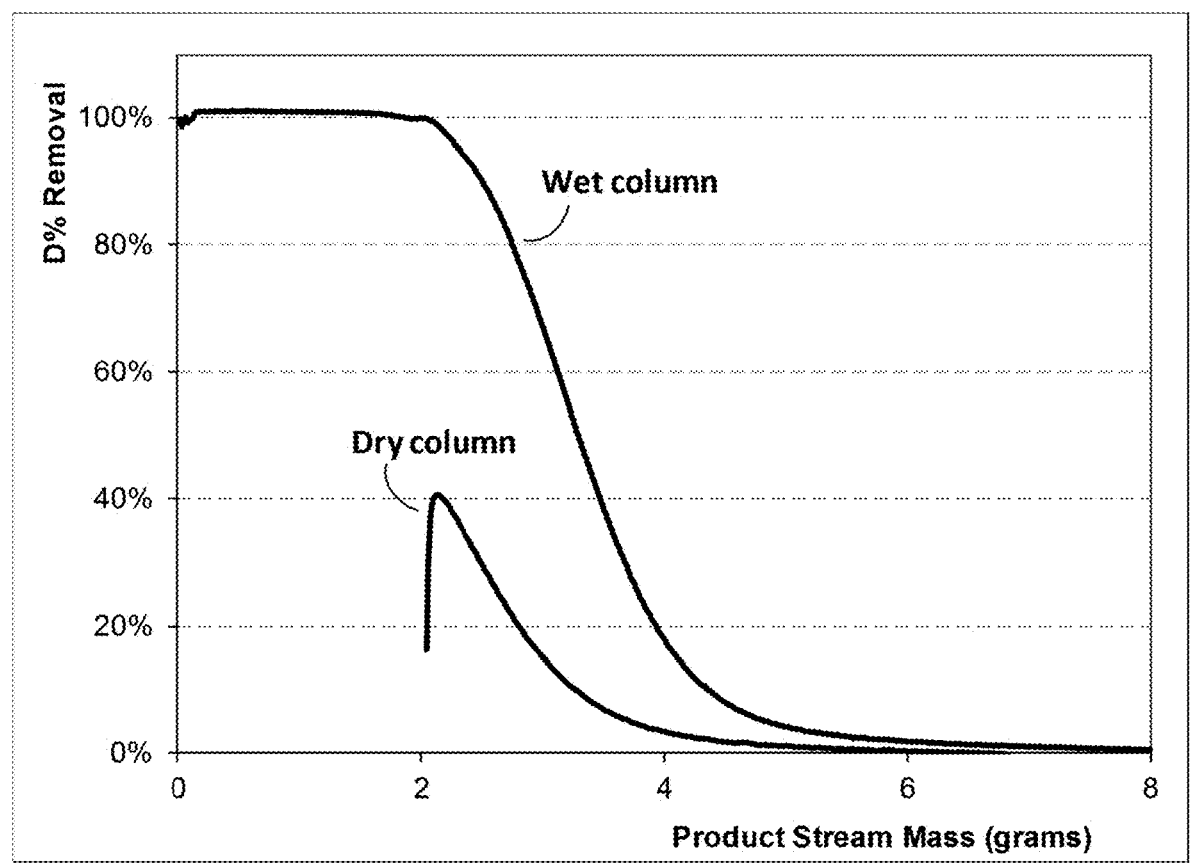
FIG. 15 compares deuterium separation results for a dry column vs. a wet column.

A modified liquid system was the utilized (FIG. 14), which used a slow liquid water injection at 0.008 g/min in conjunction with a nitrogen flow at 500 sccm in the column inlet so that the liquid water feed was vaporized to slightly less than the saturated moisture vapor pressure at ambient conditions. As indicated in FIG. 15, this approach worked equivalently to the vapor phase process described above that utilized a bubbler. By slowly injecting liquid water with a carrier gas, the deuterium removal reached a peak of 40% in the dry column.

Figure 16:
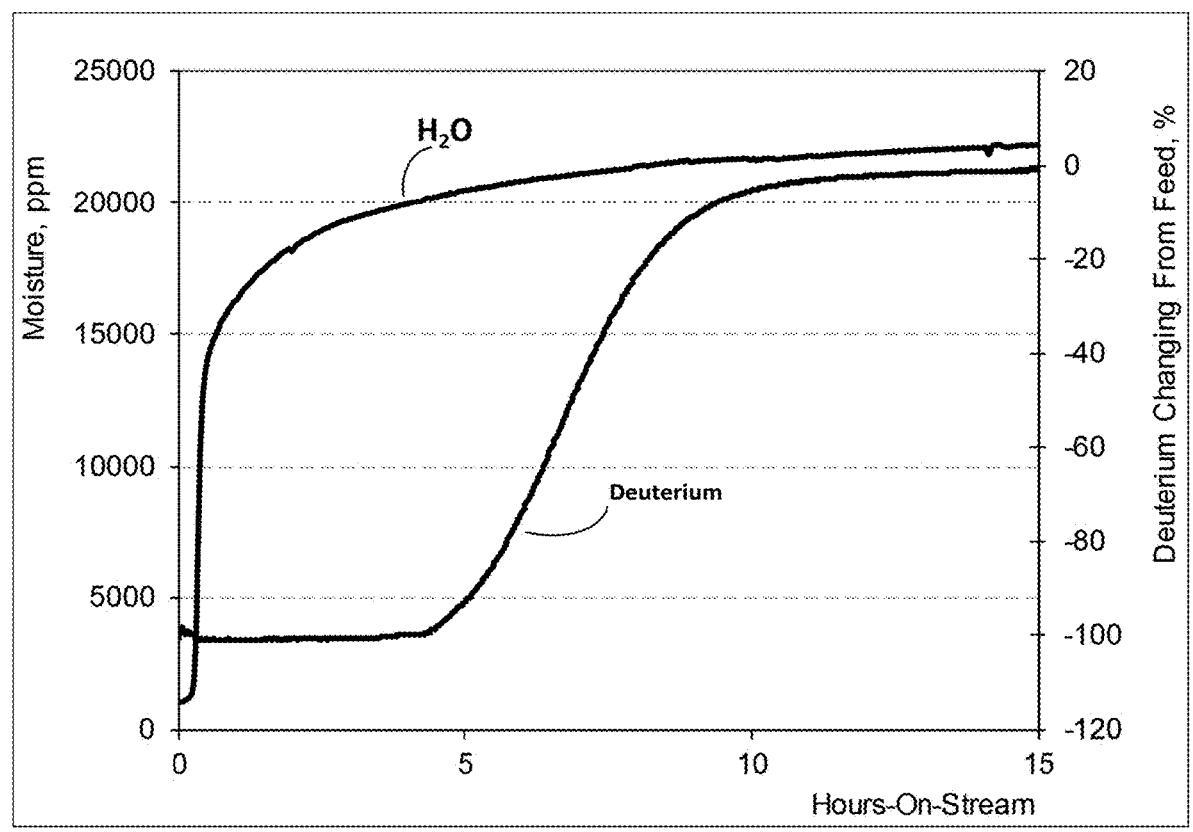
FIG. 16 illustrates the change in water and deuterium content in an effluent with time of operation of a system as described herein.

A wet column was then prepared for examination of a liquid system. The wet column was prepared by injecting water to the column (without the interested heavy isotope for the test, e.g., deuterium-depleted water in this case). As indicated in FIG. 16, when testing with the wet column, moisture showed up in the effluent almost immediately on the time scale of the test (<10 minutes), and deuterium remained at essentially zero until complete breakthrough at about 4.5 hours. This result differed from testing in a dry column wherein moisture did not show up until several hours later (FIG. 15). Utilization of the wet column demonstrated higher efficiency and capacity, resulting higher D % removal (close to 100%) and more water being processed.

The lower temperature advantage found with the vapor phase water isotope separation (as described above) also verified with the liquid phase water injection.

The wet column was also tested with vapor phase water isotope separation (carrying gas through a bubbler) for the various different parameters described above (separation material, temperature, feed concentration, flow orientation).

Table 1 compares the relative deuterium removal according to the different approaches described in the Examples above and utilizing a 1-foot column by integration of the peak area beneath the plot for D % Removal vs. product stream mass (grams). Chilled conditions included 5.9° C. and 750 Torr barometric pressure. Ambient conditions included 22° C. and 750 Torr barometric pressure.

TABLE 1

| Feed Type | Vapor | Liquid |
|---|---|---|
| Example 1 | 100 | — |
| Material screening (NaY) | 251 | 296 |
| Dry column, chilled | 964 | 1554 |
| Wet column, ambient | 3750 | 4580 |
| Wet column, chilled | 4214 | 4205 |

As can be seen, both vapor phase and liquid phase water isotope separations can be improved through selection of separation material, temperature, and wet/dry column selection, for instance, up to about 42 times improvement as compared to the initial results reported in Example 1, above.

Example 5

The separation system described in Example 1 was utilized for tritium separation. Separation materials examined included NaY zeolite and a palladium-loaded 4A zeolite (Pd/4A). Both wet and dry columns were examined. The feed water included about 1900 pCi/g tritium as found in environmental sampling. Table 2 shows the test results. Few runs were repeated with the same column packing material after baking out moisture.

TABLE 2

| Column Material | Column | Feed pCi/g | Analtical Uncertainty pCi/g | Effluent pCi/g | Analytical Uncertainty pCi/g |
|---|---|---|---|---|---|
| NaY | Dry | 1935 | 5.4 | 1624 | 5.1 |
| NaY | Repeat | 1947 | 5.7 | 1616 | 5.0 |
| Pd/4A | Dry | 1840 | 5.9 | 1461 | 6.1 |
| Pd/4A | Repeat | 1738 | 6.2 | 1524 | 5.5 |
| Na/Y | Wet | 1802 | 5.4 | 22 | 1.0 |
| Na/Y | Wet | 1802 | 5.4 | 647 | 4.7 |
| Repeat | Wet | 1800 | 5.4 | 40 | 1.2 |
| Repeat | Wet | 1800 | 5.7 | 573 | 4.6 |
| Pd/4A | Wet | 1670 | 4.9 | 2.0 | 0.8 |
| Pd/4A | Wet | 1670 | 4.9 | 112 | 1.9 |
| Repeat | Wet | 1756 | 4.9 | 3.2 | 0.7 |
| Repeat | Wet | 1756 | 4.9 | 288 | 2.8 |

As can be seen with reference to Table 2, the column isotope separation worked well for tritium removal from about 1900 pCi/g to about 1600 pCi/g with NaY, or from about 1800 pCi/g to about 1500 pCi/g with Pd/4A, both using a 1-foot dry column. The tests collected effluent moisture with a dry ice, cold trap for tritium analysis with liquid scintillation, so that the results were an average of time-on-stream effluent.

The wet column test showed even better results than the dry column. Due to more effluent moisture being collected in the cold trap, two aliquot samples were collected in each run for tritium analysis (Repeat runs in Table 2).

Feed tritium at about 1800 pCi/g was reduced to 40 pCi/g or less in the 1st sample, and below 700 pCi/g on the 2nd sample. Both NaY and Pd/4A materials were thus verified for tritium removal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A process for removal and recovery of tritium from tritium-contaminated water, the process comprising:
cooling an interior volume of an enrichment column to a temperature of about 20° C. or less, the interior volume containing a separation phase and a catalyst;
contacting the separation phase within the cooled interior volume with an aqueous stream comprising tritium-contaminated water and a carrier gas, wherein upon the contact, tritium of the aqueous stream is preferentially adsorbed onto the surface of the separation phase, thereby purifying the aqueous stream;
subsequently, contacting the separation phase comprising the adsorbed tritium with a regeneration stream, the regeneration stream comprising protium and/or deuterium in the form of hydrogen gas, deuterium gas, hydrogen deuteride, or mixtures thereof, the catalyst of the enrichment column catalyzing an isotopic exchange between the adsorbed tritium and the protium and/or the deuterium of the regeneration stream to form a tritium-enriched gaseous stream; and
separating the tritium from the tritium-enriched gaseous stream.

2. The process of claim 1, the separation phase comprising a hydrophilic material that comprises a surface area of about 100 square meters per gram or greater and/or comprises pores having an average pore diameter of about 500 Angstroms or less.

3. The process of claim 1, the separation phase comprising a type A zeolite, a type X zeolite, a type Y zeolite, a metal oxide, or a combination thereof.

4. The process of claim 3, the separation phase comprising NaY zeolite.

5. The process of claim 1, the process comprising cooling the interior volume of the enrichment column to a temperature of about 10° C. or less.

6. The process of claim 1, wherein the regeneration stream is at ambient temperature at contact with the separation phase.

7. The process of claim 1, wherein the interior volume of the enrichment column is wet prior to contacting the separation phase with the aqueous stream.

8. The process of claim 7, wherein the interior volume of the enrichment column is at a saturated water vapor pressure prior to contacting the separation phase with the aqueous stream.

9. The process of claim 7, further comprising injecting non-contaminated water into the enrichment column volume prior to contacting the separation phase with the aqueous stream.

10. The process of claim 9, wherein the separation phase remains wet during contact of the separation phase with the regeneration stream.

11. The process of claim 1, wherein the tritium is recovered from the tritium-enriched gaseous stream according to a thermal cycling absorption process.

12. The process of claim 1, the method further comprising bubbling the carrier gas through a source of the tritium-contaminated water prior to contacting the separation phase with the aqueous stream.

13. The process of claim 1, the method further comprising injecting a liquid stream comprising the tritium-contaminated water into the enrichment column in conjunction with a gaseous stream comprising the carrier gas.

14. The process of claim 1, wherein the tritium-enriched gaseous stream comprises tritium in an amount of about 50 parts per million or greater.

15. The process of claim 1, further comprising a second enrichment column, wherein
contemporaneous with contacting the separation phase of the enrichment column of claim 1 with the aqueous stream, a separation phase of the second enrichment column is contacted with the regeneration stream; and
contemporaneous with contacting the separation phase of the enrichment column of claim 1 with the regeneration stream, the separation phase of the second enrichment column is contacted with the aqueous stream.

16. A system for removal and recovery of tritium from a tritium-contaminated aqueous stream, the system comprising:
an enrichment column containing a separation phase and a catalyst within an interior volume, the enrichment column including a first inlet at a first end of the enrichment column configured for receiving the tritium-contaminated aqueous stream and a first outlet at a second end of the enrichment column for exit of a purified aqueous stream, the enrichment column further comprising a second inlet at the second end of the enrichment column for receiving a gaseous regeneration stream that includes protium and/or deuterium in the form of hydrogen gas, deuterium gas, hydrogen deuteride gas, or mixtures thereof, and a second outlet at the first end of the enrichment column for exit of a tritium-enriched gaseous flow;
a cooling system in communication with an interior volume of the enrichment column; and
a thermal cycling absorption column in fluid communication with the second outlet of the enrichment column, wherein the thermal cycling absorption column comprises an inverse separation column that includes a separation material that preferentially adsorbs tritium at an absorption temperature and that releases the adsorbed tritium at a release temperature.

17. The system of claim 16, further comprising a water injection port configured to inject non-contaminated water into the interior volume of the enrichment column.

18. The system of claim 16, further comprising a second enrichment column in fluid communication with the thermal cycling absorption column, wherein the second enrichment column is configured for parallel operation with the enrichment column of claim 15.

19. The system of claim 18, wherein the second enrichment column is configured for countercurrent operation to the enrichment column of claim 16.

20. The system of claim 16, wherein the first inlet is configured to receive a liquid stream comprising tritium-contaminated water and a gaseous stream comprising a carrier gas.

21. The system of claim 16, wherein the first inlet is configured to receive the tritium-contaminated aqueous stream in the form of a vapor stream comprising tritium-contaminated vapor in a carrier gas.

* * * * *